US011905768B2

(12) United States Patent
Triche et al.

(10) Patent No.: US 11,905,768 B2
(45) **Date of Patent: *Feb. 20, 2024**

(54) COMPENSATING RIG ELEVATOR

(71) Applicant: CAJUN SERVICES UNLIMITED, LLC, Gray, LA (US)

(72) Inventors: Shane Triche, Houma, LA (US); Heath Triche, Gray, LA (US)

(73) Assignee: Spoked Solutions, LLC, Houma, LA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/909,792

(22) Filed: Jun. 23, 2020

(65) Prior Publication Data

US 2020/0392797 A1 Dec. 17, 2020

Related U.S. Application Data

(63) Continuation of application No. 15/872,671, filed on Jan. 16, 2018, now Pat. No. 10,689,923.

(60) Provisional application No. 62/445,855, filed on Jan. 13, 2017.

(51) Int. Cl.

| | |
|---|---|
| ***E21B 19/07*** | (2006.01) |
| ***E21B 19/089*** | (2006.01) |
| ***B66C 1/44*** | (2006.01) |
| ***E21B 19/09*** | (2006.01) |

(52) U.S. Cl.

CPC ................ *E21B 19/07* (2013.01); *B66C 1/44* (2013.01); *E21B 19/089* (2013.01); *E21B 19/09* (2013.01)

(58) Field of Classification Search

CPC ......... E21B 19/07; E21B 19/089; E21B 19/09

See application file for complete search history.

(56) References Cited

U.S. PATENT DOCUMENTS

| | | | | |
|---|---|---|---|---|
| 1,397,072 A * | 11/1921 | Black | E21B 19/06 294/90 |
| 2,172,908 A | 9/1939 | Jack | |
| 2,211,016 A * | 8/1940 | Krell | E21B 19/06 294/90 |
| 2,722,450 A | 11/1955 | Nelson | |
| 3,061,011 A | 10/1962 | Paget | |
| 4,152,953 A | 5/1979 | Headley | |

(Continued)

OTHER PUBLICATIONS

Offshore Energy Services "OES CSE Animation," YouTube, Jun. 22, 2015, 6 pages [retrieved online from: www.youtube.com/watch?v=OxvrVhlJvQQ].

(Continued)

*Primary Examiner* — Caroline N Butcher

(74) *Attorney, Agent, or Firm* — Heuton IP Law, LLC

(57) ABSTRACT

A compensating rig elevator is provided to eliminate set-down weight from threaded connectors during make-up of a pipe stand and thereby provide an ability to reduce the risk of thread galling and cross-threading. The elevator may comprise one or more hoist assemblies with bail arms that deflect as the compensating rig elevator is suspended by the bail arms and a tubular is placed in the compensating rig elevator. The bail arms actuate a locking mechanism to secure the compensating rig elevator in a closed position around the tubular. The compensating rig elevator can also have compensating rams and a slip system to positively engage the tubular and bear the weight of multiple tubulars.

19 Claims, 11 Drawing Sheets

(56) References Cited

U.S. PATENT DOCUMENTS

| | | | |
|---|---|---|---|
| 4,404,876 A | 9/1983 | Eckel | |
| 4,591,007 A | 5/1986 | Shaginian et al. | |
| 5,083,356 A | 1/1992 | Gonzalez et al. | |
| 5,297,833 A | 3/1994 | Willis et al. | |
| 5,755,289 A | 5/1998 | Angman et al. | |
| 5,967,477 A | 10/1999 | Walmsley | |
| 6,000,472 A | 12/1999 | Albright et al. | |
| 6,056,060 A | 5/2000 | Abrahamsen et al. | |
| 6,073,699 A | 6/2000 | Hollingsworth, Jr. | |
| 7,191,686 B1 | 3/2007 | Angelle et al. | |
| 7,350,586 B2 | 4/2008 | Guidry | |
| 8,141,923 B2 | 3/2012 | Bouligny et al. | |
| 9,951,559 B2 | 4/2018 | Ukonjarvi | |
| 9,988,862 B2 | 6/2018 | Triche et al. | |
| 10,689,923 B2 | 6/2020 | Triche et al. | |
| 2002/0144575 A1 | 10/2002 | Niven | |
| 2013/0146304 A1 | 6/2013 | Sonnier | |
| 2015/0247367 A1* | 9/2015 | Angelle | E21B 19/06<br>166/380 |
| 2018/0283111 A1 | 10/2018 | Triche et al. | |

OTHER PUBLICATIONS

Official Action for U.S. Appl. No. 15/872,671, dated Sep. 5, 2019 12 pages.

Notice of Allowance for U.S. Appl. No. 15/872,671, dated Feb. 6, 2020.

* cited by examiner

SECTION A-A

SECTION A-A

SECTION B-B

SECTION B-B

COMPENSATING RIG ELEVATOR

CROSS REFERENCE TO RELATED APPLICATION

This application is a continuation of U.S. patent application Ser. No. 15/872,671, now U.S. Pat. No. 10,689,923, filed on Jan. 16, 2018, which claims the benefit of U.S. Application Ser. No. 62/445,855, filed on Jan. 13, 2017, all of which are incorporated by reference in their entireties.

FIELD OF THE INVENTION

The invention relates to an apparatus and methods for lifting tubulars while permitting a compensation of the same due to outside forces on the infrastructure of the body used to support the tubular such as a derrick.

BACKGROUND OF THE INVENTION

In the oil and gas industry, wellbores are drilled into the earth using drilling rigs, where tubulars are threaded together to form long tubular strings that are inserted into the wellbore to extract the desired fluid. The tubing string is generally suspended in the borehole using a rig floor-mounted spider or slips, such that each new tubular segment or stand may be threaded onto the end of the previous tubular just above the spider. A single joint or stand elevator, such as that disclosed by U.S. Pat. No. 8,141,923, which is incorporated herein by reference, is commonly used to grip and secure the segment or stand to a hoist to lift the segment or stand into position for threading the tubular together. A compensator, such as that disclosed by U.S. Pat. No. 6,000,472, which is incorporated herein by reference, is generally used in combination with single joint or stand elevators to reduce the weight of the stand on the connection of the previous string. Once set into position the tubular is rotated with a power tong and the entire elevator is allowed to rotate with the aid of a swivel to facilitate the threading of the connection. Once the connection is threaded a string elevator is used to lower the string to the rig floor. Once lowered the spider or slips are activated to suspend the string once more. This process continues until the required number of tubing segments have been lowered into the well.

In general, single joint or stand elevators are specifically adapted for securing and lifting tubular segments having a conventional connection, such as an internally threaded sleeve that receives and secures an externally threaded end from each of two tubular segments to secure the segments in a generally abutting relationship. And compensators are specifically adapted to the system to permit controlled maneuverability of the segment to eliminate costly damage to the lifted segment, the segment in the spider, or operational efficiency. Also, swivels are employed to allow rotation of the elevator thus giving the ability to rotate and secure the tubular segments in said relationship.

Most single joint or stand elevators are suspended below the string elevator using cables, a swivel and one or two compensating rams in parallel. This method of using compensating rams to hold up the single joint elevator may have great safety consequences. Should the compensating ram or rams fail it is possible to drop the elevator and tubing to the rig floor. To reduce the safety concern most compensating rams are fitted with safety cables to prevent the elevator from falling. However, there are still safety concerns due to the stand of tubulars swinging violently should one of the compensating rams fail.

At least one challenge encountered by tubular running companies is maintaining proper thread integrity of the connections while making up the stand to the string of tubulars. Generally, if the threads of the two connecting tubulars are not properly aligned and then engaged when the rotation of the make-up string with power tongs begins, the threads of both connections will usually gall or be crushed to a state of non-compliance with industry standards. This result may also occur when too little or excessive weight is applied by the hoisted segment onto the segment secured by the spider. Typically these connections will have to be removed from the string and discarded or sent back to the manufacturer to be re-threaded. This removal of tubulars and connections from the string can be time consuming and very costly to the rig operator.

SUMMARY OF THE INVENTION

The invention would provide a Compensating Rig Elevator (CRE) that may be used to eliminate set-down weight from threaded connectors during make-up and thereby provide an ability to reduce the risk of thread galling and cross-threading. In particular, but not exclusively, the invention relates to a tool for, and a method of, reducing the probability of damage to threads while making up or breaking out tubulars and a method to minimize the amount of equipment used in the make-up and break out of tubulars thus increasing efficiency and safety. The invention eliminates the need for a separate and independent compensating system to be placed between the single joint elevator and the traveling block. The invention further provides an ability to incorporate the Elevator Roller Insert System (EMS) disclosed by International Patent Publication No. WO2016/154253, which is incorporated herein by reference. When used in conjunction with the EMS, the invention provides rotational as well as vertical maneuverability without the need of any movement of the elevator.

The invention provides an apparatus and a method for lifting a single joint or stand of pipe with control for safe engagement into the box end of a previously secured tubular segment. Said apparatus would have an integrated compensation system within the apparatus.

An objective of the invention is to provide a compensating single joint elevator system that may be seamlessly integrated into existing tubular running setups.

Another objective of the invention is to give the ability to minimize the number of individual pieces of equipment required to run tubulars.

A further objective is to provide a means of allowing the tubulars to rotate within the elevator without the need for pneumatic or hydraulic control lines by integrating with a system such as the ERIS.

An apparatus of this nature will also significantly reduce the amount of loss time and money due to galled or destroyed connections by providing a compensating aspect.

An apparatus of this nature may reduce the height requirement of the draw works, thus allowing the driller a better visual of equipment in use.

An apparatus of this nature may eliminate most safety concerns with typical compensating elevators by removing the need for a swivel and separate compensating rams.

One particular embodiment of the present invention is a compensating rig elevator, comprising a first upper portion rotatable about a hinge axis relative to a second upper portion, wherein the first upper portion is rotatable between an open position and a closed position; a first lower portion rotatable about the hinge axis relative to a second lower portion, wherein the first lower portion is rotatable between the open position and the closed position; a first hoist assembly connected to the first upper portion and connected to the first lower portion, and a second hoist assembly connected to the second upper portion and connected to the second lower portion, each hoist assembly comprising: a hoist rod having an upper part connected to the upper portion and a lower part connected to the lower portion; a bail arm positioned about the upper part of the hoist rod; and a spring operably connected to the bail arm and operably connected to the upper portion to dampen motion of the bail arm toward the upper portions along a compensation axis that is substantially parallel to the hinge axis.

In some embodiments, the elevator further comprises at least one guide plate connected to the second upper portion; a locking mechanism connected to the first hoist assembly and to the first upper portion, wherein the locking mechanism translates the movement of the bail arm of the first hoist assembly toward the upper portions along the compensation axis to a lock pin, wherein the lock pin extends through the at least one guide plate and the first upper portion to secure the first upper portion in the closed position. In various embodiments, the locking mechanism further comprises a push rod connected to the bail arm of the first hoist assembly; a push arm connected to the push rod, the push arm having a proximal end and a distal end, wherein the push arm is rotatable about a lock axis that is perpendicular to the hinge axis; wherein the push rod translates the movement of the bail arm of the first hoist assembly to the proximal end of the push rod, and the push rod rotates about the lock axis such that the distal end of the push rod moves the lock pin through the at least one guide plate and the first upper portion to secure the first upper portion in the closed position.

In some embodiments, the elevator further comprises an upper hinge connected to the first upper portion and connected to the second upper portion such that first upper portion is rotatable relative to the second upper portion about the hinge axis which extends through the upper hinge; a latch assembly connected to the upper hinge and connected to the second upper portion, the latch assembly having a latch configured to selectively interconnect to a latch catch on the first upper portion to secure the first upper portion in the closed position. In various embodiments, the latch assembly further comprises an opening ram connected to the upper hinge and connected to a bell crank, wherein the bell crank is rotatably connected to the second upper portion; a latch rod connected to the bell crank and connected to the latch, wherein a change in length of the opening ram rotates the bell crank, which moves the latch rod, and wherein movement of the latch rod selectively interconnects the latch to the latch catch on the first upper portion to secure the first upper portion in the closed position.

In some embodiments, the elevator further comprises a first middle portion rotatable about the hinge axis relative to a second middle portion, wherein the first middle portion is rotatable between the open position and the closed position; at least one compensating ram connecting the middle portions to the lower portions; and a plurality of rollers connected to the middle portions, wherein the plurality of rollers is configured to receive a tubular. In various embodiments, the elevator further comprises at least one guide rod connecting the upper portions to the lower portions, wherein each guide rod of the at least one guide rod extends through an aperture in the middle portions.

Another particular embodiment of the present invention is a method of assembling tubulars using a compensating rig elevator, comprising: (1) providing the compensating rig elevator having: (a) a first upper portion rotatable about a hinge axis relative to a second upper portion, wherein the first upper portion is rotatable between an open position and a closed position; (b) a first lower portion rotatable about the hinge axis relative to a second lower portion, wherein the first lower portion is rotatable between the open position and the closed position; (c) a first hoist assembly connected to the first upper portion and connected to the first lower portion, and a second hoist assembly connected to the second upper portion and connected to the second lower portion, wherein the hoist assemblies are configured to dampen motion of bail arms of the hoist assemblies toward the upper portions along a compensation axis that is substantially parallel to the hinge axis; (d) a first middle portion rotatable about the hinge axis relative to a second middle portion, wherein the first middle portion is rotatable between the open position and the closed position, and where the middle portions are connected to the lower portions; (e) a plurality of rollers connected to the middle portions; (2) suspending the compensating rig elevator by the bail arms; (3) positioning at least one tubular in the compensating rig elevator such that the at least one tubular contacts the plurality of rollers to deflect the bail arms along the compensation axis; and (4) freely rotating the at least one tubular relative to the compensating rig elevator to start a selective interconnection between a pin end of the at least one tubular and a box end of another tubular.

In various embodiments, the method further comprises providing the compensating rig elevator having: (f) at least one guide plate connected to the second upper portion; (g) a locking mechanism connected to the first hoist assembly and connected to the first upper portion; (5) translating, by the locking mechanism, the movement of the bail arm of the first hoist assembly toward the upper portions along the compensation axis to a lock pin such that the lock pin extends through the at least one guide plate and the first upper portion to secure the first upper portion in the closed position. In some embodiments, the method further comprises providing the compensating rig elevator having: (h) an upper hinge connected to the first upper portion and connected to the second upper portion such that first upper portion is rotatable relative to the second upper portion about the hinge axis which extends through the upper hinge; (i) a latch catch of the first upper portion; (j) a latch assembly connected to the upper hinge and connected to the second upper portion, wherein the latch assembly has a latch; (6) articulating the latch assembly such that the latch selectively interconnects to the latch catch to secure the first upper portion in the closed position.

In various embodiments, the method further comprises providing the compensating rig elevator having: (k) a first middle portion rotatable about the hinge axis relative to a second middle portion, wherein the first middle portion is rotatable between the open position and the closed position; (l) at least one compensating ram connecting the middle portions to the lower portions; (7) varying, by the at least one compensating ram, a distance between the middle portions and the lower portions between a first position and a second position.

In some embodiments, the method further comprises providing the compensating rig elevator having: (m) a plurality of slip rods connected to the middle portions, each slip rod having a slip positioned at a distal end; (8) varying, by the at least one compensating ram, the distance between the middle portions and the lower portions to the first position such that the plurality of slips form an initial inner diameter; and (9) varying, by the at least one compensating ram, the distance between the middle portions and the lower portions to the second position such that the plurality of slips form a final inner diameter that is smaller than the initial inner diameter such that the plurality of slips engages the at least one tubular.

In various embodiments, the method further comprises providing the compensating rig elevator having: (n) at least one guide roller on the middle portions; (o) at least one guide rod connected to the upper portions and connected to the lower portions, wherein each guide rod of the at least one guide rod extends through an aperture in the middle portions proximate to the at least one guide roller; (10) varying the position of the middle portions relative to the upper and lower portions such that the at least one guide rod rotates the at least one guide roller. In some embodiments, the suspending step comprises suspending the compensating rig elevator from a traveling block by the bail arms.

Yet another particular embodiment of the present invention is a compensating rig elevator, comprising a first upper portion rotatable about a hinge axis relative to a second upper portion, wherein the first upper portion is rotatable between an open position and a closed position; a first lower portion rotatable about the hinge axis relative to a second lower portion, wherein the first lower portion is rotatable between the open position and the closed position; at least one hoist rod connecting the upper portions to the lower portions; a first middle portion rotatable about the hinge axis relative to a second middle portion, wherein the first middle portion is rotatable between the open position and the closed position; at least one compensating ram connecting the middle portions to the lower portions, the at least one compensating ram configured to vary a distance between the middle portions and the lower portions; and a plurality of slip rods connected to the middle portions, each slip rod having a slip positioned at a distal end, wherein the plurality of slips form an initial inner diameter when the middle portions are an initial distance from the lower portions, and wherein the plurality of slips form a final inner diameter when the middle portions are a final distance from the lower portions such that the final inner diameter is smaller than the initial inner diameter.

In some embodiments, the elevator further comprises a first hoist assembly connected to the first upper portion and connected to the first lower portion, and a second hoist assembly connected to the second upper portion and connected to the second lower portion, each hoist assembly comprising: a hoist rod from the at least one hoist rod, the hoist rod having an upper part connected to the upper portion and a lower part connected to the lower portion; a bail arm positioned about the upper part of the hoist rod; and a spring operably connected to the bail arm and operably connected to the upper portion to dampen motion of the bail arm toward the upper portions along a compensation axis that is substantially parallel to the hinge axis. In various embodiments, the elevator further comprises at least one guide plate connected to the second upper portion; a locking mechanism connected to the first hoist assembly and to the first upper portion, wherein the locking mechanism translates the movement of the bail arm of the first hoist assembly toward the upper portions along the compensation axis to a lock pin, wherein the lock pin extends through the at least one guide plate and the first upper portion to secure the first upper portion in the closed position. In some embodiments, the locking mechanism further comprises a push rod connected to the bail arm of the first hoist assembly; a push arm connected to the push rod, the push arm having a proximal end and a distal end, wherein the push arm is rotatable about a lock axis that is perpendicular to the hinge axis; wherein the push rod translates the movement of the bail arm of the first hoist assembly to the proximal end of the push rod, and the push rod rotates about the lock axis such that the distal end of the push rod moves the lock pin through the at least one guide plate and the first upper portion to secure the first upper portion in the closed position.

In various embodiments, the elevator further comprises an upper hinge connected to the first upper portion and connected to the second upper portion such that first upper portion is rotatable relative to the second upper portion about the hinge axis which extends through the upper hinge; a latch assembly connected to the upper hinge and connected to the second upper portion, the latch assembly having a latch configured to selectively interconnect to a latch catch on the first upper portion to secure the first upper portion in the closed position. In some embodiments, the latch assembly further comprises an opening ram connected to the upper hinge and connected to a bell crank, wherein the bell crank is rotatably connected to the second upper portion; a latch rod connected to the bell crank and connected to the latch, wherein a change in length of the opening ram rotates the bell crank, which moves the latch rod, and wherein movement of the latch rod selectively interconnects the latch to the latch catch on the first upper portion to secure the first upper portion in the closed position.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements or components. Additional aspects of the present invention will become more readily apparent from the Detailed Description, particularly when taken together with the drawings.

The above-described embodiments, objectives, and configurations are neither complete nor exhaustive. As will be appreciated, other embodiments of the invention are possible using, alone or in combination, one or more of the features set forth above or described in detail below. The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

BRIEF DESCRIPTION OF THE DRAWINGS

The accompanying drawings, which are incorporated in and constitute a part of the specification, illustrate embodiments of the invention and together with the Summary of the Invention given above and the Detailed Description of the drawings given below, serve to explain the principles of these embodiments. In certain instances, details that are not necessary for an understanding of the invention or that render other details difficult to perceive may have been omitted. It should be understood, of course, that the invention is not necessarily limited to the particular embodiments illustrated herein. Additionally, it should be understood that the drawings are not necessarily to scale.

Figure 1:
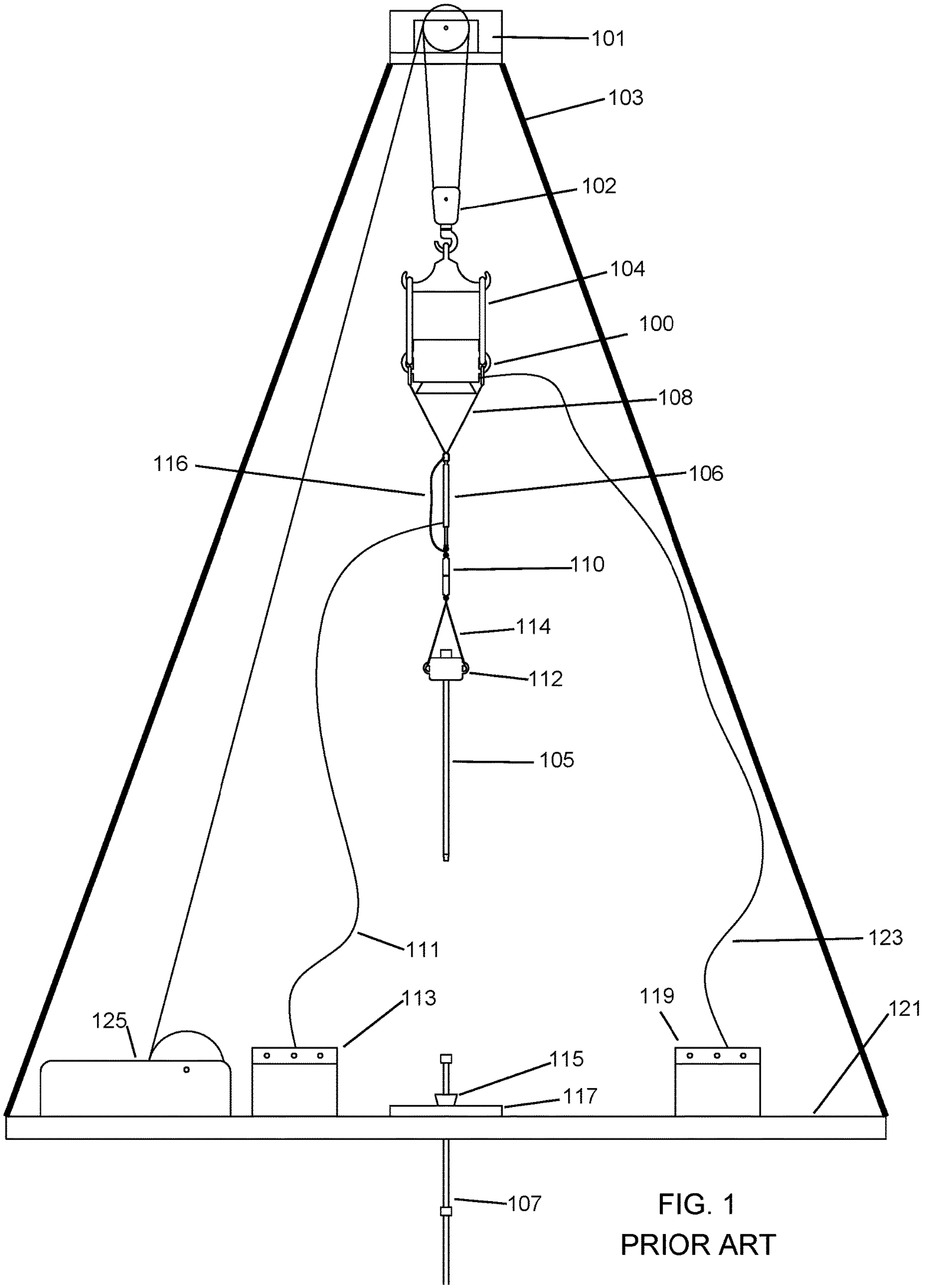
FIG. 1 PRIOR ART
FIG. 1 is a diagram of a rig-up of a prior art compensating system on an oil and gas rig.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

A list of the various components shown in the drawings and associated numbering is provided herein:

| Number | Component |
|---|---|
| **100** | String Elevator |
| **101** | Crown Block |
| **102** | Traveling Block |
| **103** | Derrick |
| **104** | Elevator Bails |
| **105** | Tubular |
| **106** | Compensating Ram |
| **107** | Tubular String |
| **108** | Wire Rope Sling |
| **109** | Tubing Stand |
| **110** | Swivel |
| **111** | Compensating Ram Control Line |
| **112** | Single Joint Elevator |
| **113** | Compensating Ram Control Unit |
| **114** | Wire Rope Sling |
| **115** | Slips |
| **116** | Safety Cable |
| **117** | Spider |
| **118** | Compensating Rig Elevator (CRE) |
| **119** | Elevator Control Unit |
| **120** | Upper Segment |
| **121** | Rig Floor |
| **122** | First Upper Portion |
| **123** | Elevator Control Line |
| **124** | Second Upper Portion |
| **125** | Draw Works |
| **126** | Upper Hinge |
| **127** | CRE Control Line |
| **128** | Upper Guide Plates |
| **129** | CRE Control Unit |
| **130** | Upper Latch Catch |
| **132** | Lower Segment |
| **134** | First Lower Portion |
| **136** | Second Lower Portion |
| **138** | Lower Hinge |
| **140** | Lower Guide Plates |
| **142** | Lower Latch Catch |
| **144** | Elevator Roller Insert System (ERIS) |
| **146** | Middle Segment |
| **148** | First Middle Portion |
| **150** | Second Middle Portion |
| **152** | Middle Guide Plates |
| **154** | Upper Opening Ram |
| **156** | Upper Bell Crank |
| **158** | Upper Latch Rod |
| **160** | Upper Latch |
| **162** | Upper Latch Spring |
| **164** | Lower Opening Ram |
| **166** | Lower Bell Crank |
| **168** | Lower Latch Rod |
| **170** | Lower Latch |
| **172** | Lower Latch Spring |
| **174***a*, **174***b* | Hoist Rod |
| **176***a*, **176***b* | Bail Arm |
| **178***a*, **178***b* | Bail Pin |
| **180***a*, **180***b* | Hoist Spring |
| **182** | Push Rod Attachment |

184*a*, 184*b* Push Rod
186*a*, 186*b* Push Arm
188*a*, 188*b* Clevis
190*a*, 190*b* Lock Pin
192 Guide Rod
194 Guide Roller
196 Compensating Ram
198 Slips
200 Slip Push Rod
202 Slip Clevis
204 Upper Slip Segment
206 Lower Slip Segment
208 Slip Spring

DETAILED DESCRIPTION

The invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, and may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

The compensating rig elevator (CRE) of the present invention comprises, in one embodiment, a pair of deployable jaws or segments cooperating with a pair of static jaws to secure a pipe within the slot of a generally circular-shaped body. The deployable jaws of the CRE of the present invention may be rotatably deployable or translatably deployable, or both. In one embodiment, each jaw, including the static jaws and the deployable jaws, comprises a pipe slip movably disposed within the jaw to secure a pipe segment within the slot and to self-tighten as the weight of the pipe segment secured within the CRE is transferred to the slips and the jaws. The CRE of the present invention also comprises load-compensation that may be used to eliminate set-down weight from threaded connectors during make-up and thereby provide an ability to reduce the risk of thread galling and cross-threading. The compensation ability of the CRE will permit vertical maneuverability when used alone and rotational maneuverability when used in conjunction with an elevator roller insert system (EMS). The present invention would eliminate the need for a separate and independent compensating system to be placed between the single joint elevator and traveling block. In particular, but not exclusively, the invention relates to a tool for, and a method of, reducing the probability of damage to threads while making up or breaking out tubulars, an ability to incorporate an EMS, and a method to minimize the amount of equipment used in the make-up and break out of tubulars thus increasing efficiency and safety. The CRE can be used to run any sized tubular.

Now referring to FIG. 1, a diagram of a rig-up of prior art compensating system on an oil and gas rig is provided. In the referenced prior art system, a string elevator 100 is suspended from a travelling block 102 using elevator bails 104, and the traveling block 102 is suspended from a crown block 101 of a derrick 103. A draw works 125 controls the height of the travelling block 102 above the rig floor 121. A compensating ram 106 is then suspended from the string elevator 100 using a wire rope sling 108. A swivel 110 is then attached to the end of the compensating ram 106 to enable rotation of a single joint elevator 112, which is suspended from the swivel 110 using a wire rope sling 114. The single joint elevator 112 can receive a tubular 105 for various rig operations. Single joint elevator 112 can hold the tubular 105 to interconnect the tubular 105 to a tubular string 107, which is held by slips 115 and spiders 117 on the rig floor 121.

Finally, as a safety precaution in the event of failure of the compensating ram 106, a safety cable 116 is attached to the connection point between the wire rope sling 108 and the compensating ram 106 and the connection point between the compensating ram 106 and the swivel 110. Two different control units are required to operate both the compensating ram 106 and the elevator 100. A compensating ram control line 111 connected a compensating ram control unit 113 to the compensating ram 106, and an elevator control line 123 connects an elevator control unit 119 to the elevator 100.

Figure 2:
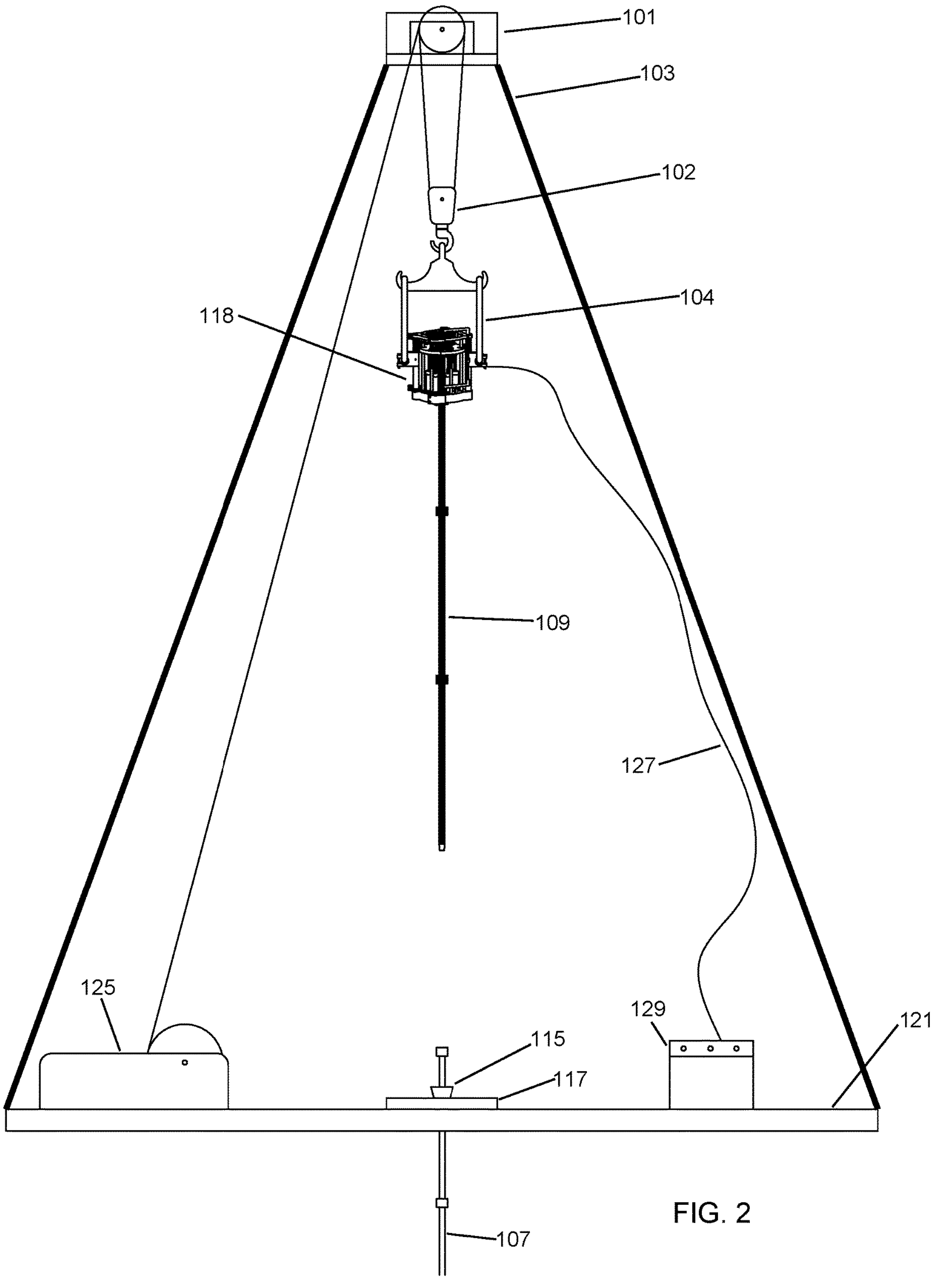
FIG. 2 is a diagram of a rig-up of compensating rig elevator according to one embodiment of the present invention.
Figure 3A:
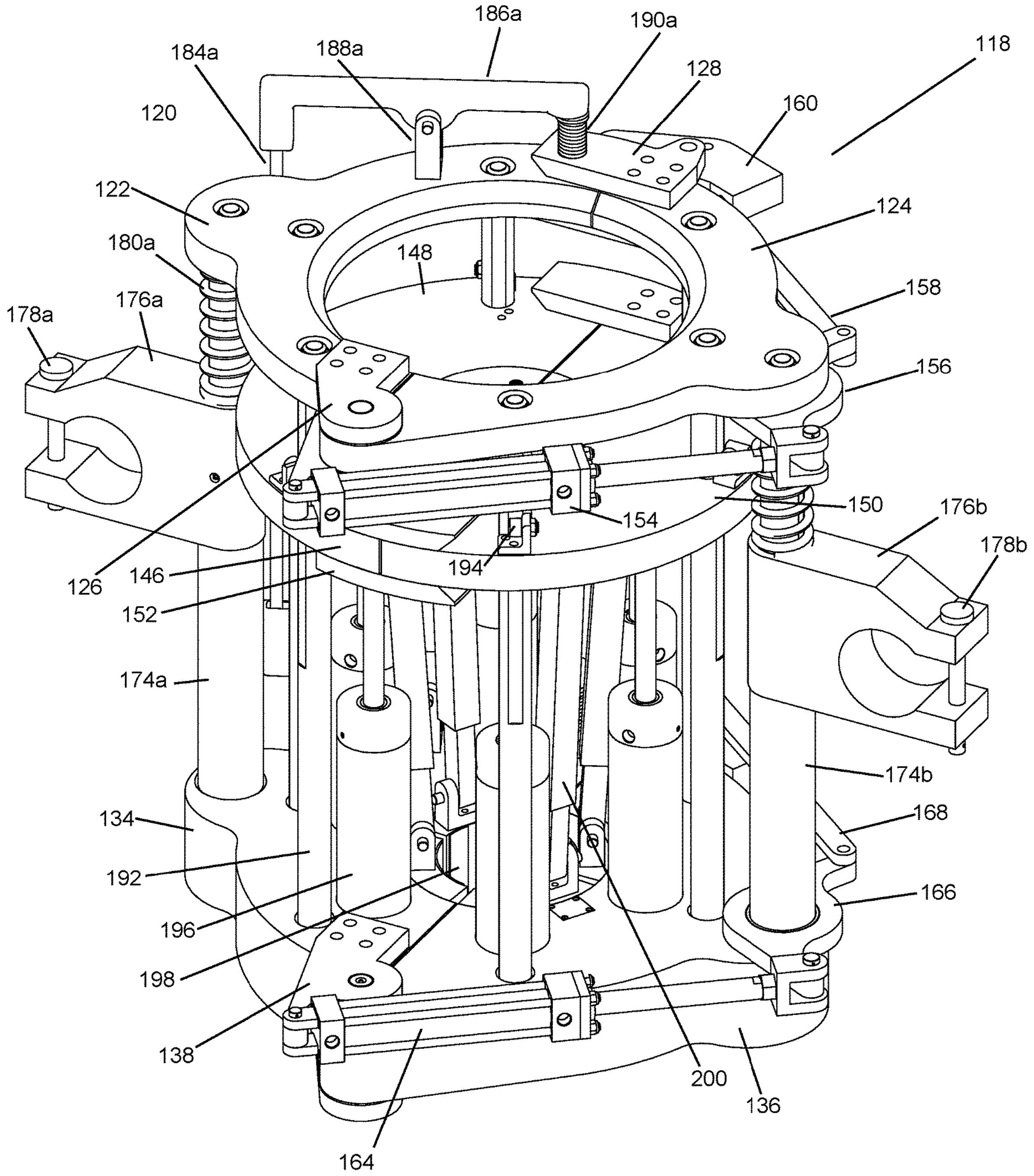
FIG. 3A is a perspective view of a compensating rig elevator in a closed position according to one embodiment of the present invention.
Figure 3B:
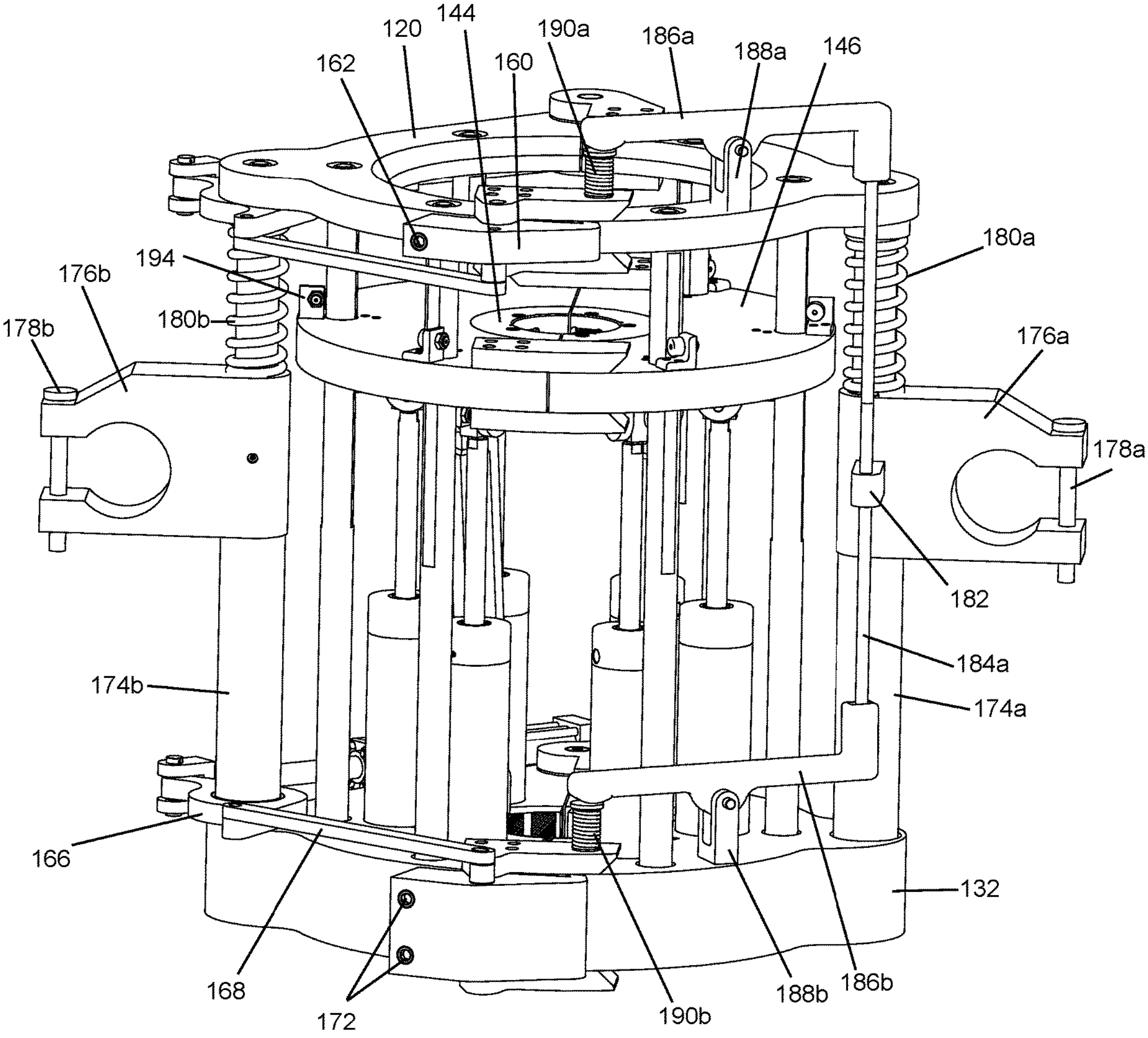
FIG. 3B is another perspective view of the compensating rig elevator of FIG. 3A according to one embodiment of the present invention.
Figure 3C:
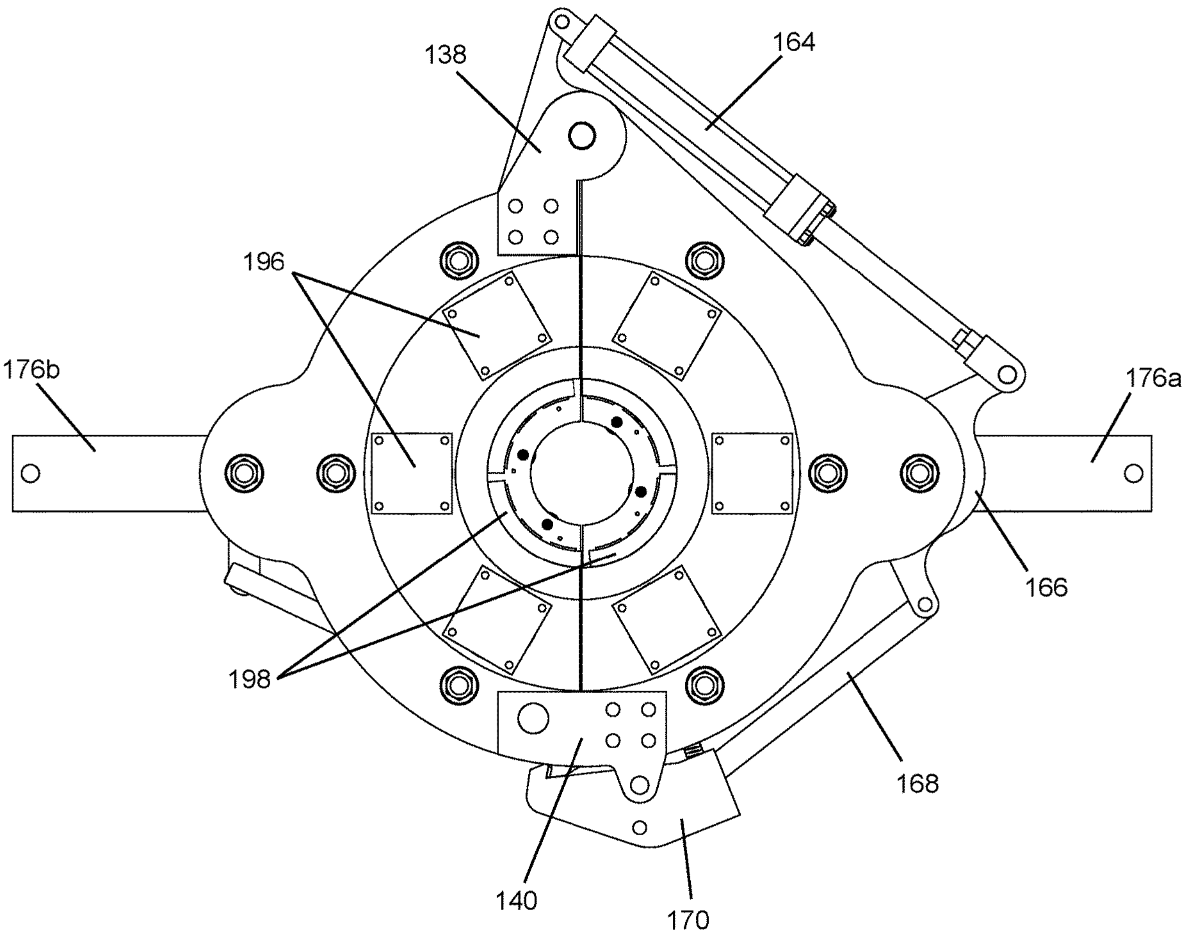
FIG. 3C is a bottom plan view of the compensating rig elevator of FIG. 3A according to one embodiment of the present invention.
Figure 3D:
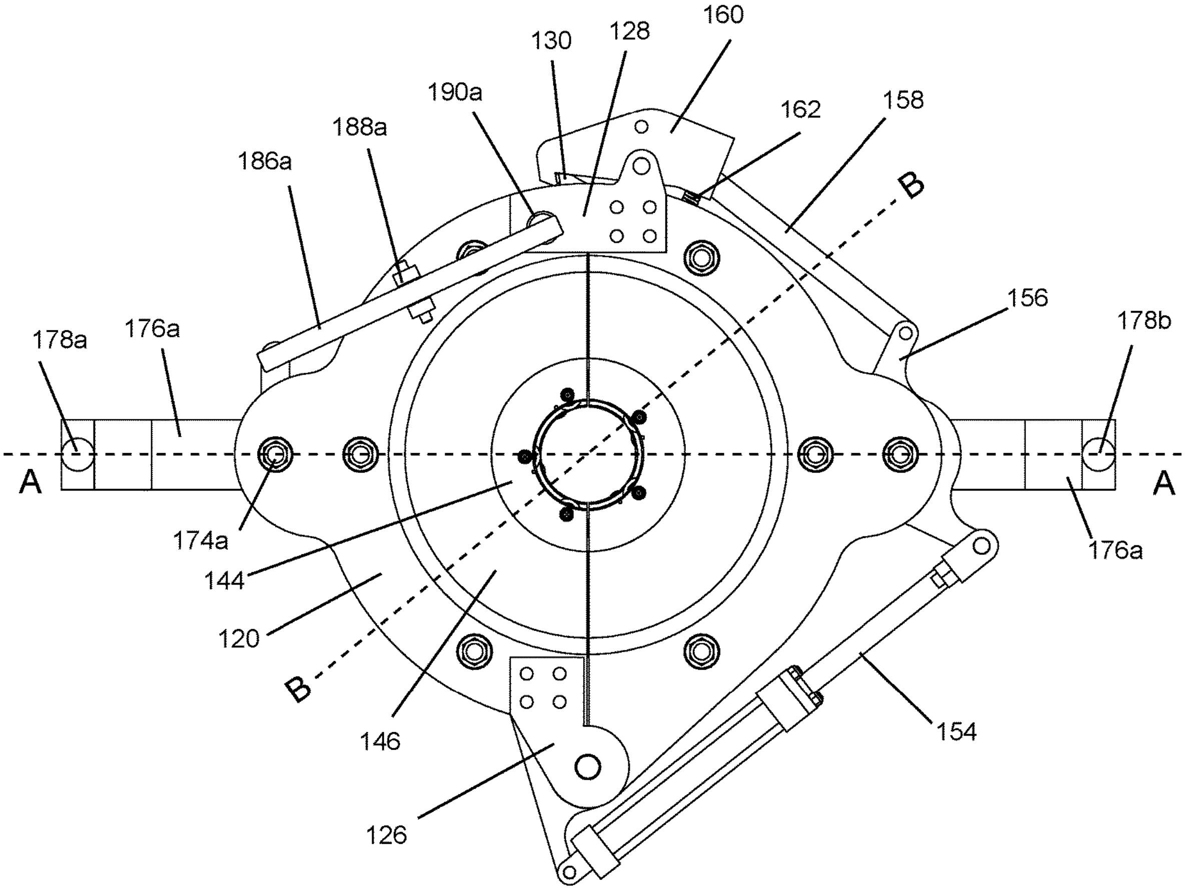
FIG. 3D is a top plan view of the compensating rig elevator of FIG. 3A according to one embodiment of the present invention.

Now referring to FIG. 2, a diagram of one possible rig-up of a preferred embodiment of the present invention is provided. A CRE 118 is suspended from the traveling block 102 using elevator bails 104, and the CRE 118 is configured to receive a tubular stand 109. It will be appreciated that this possible rig-up of a preferred embodiment of the present invention, as compared to the prior art system of FIG. 1, eliminates the need for several components, including the string elevator 100, the compensating ram 106, the swivel 110, the single joint elevator 112, the safety cable 116, and the wire rope slings 108, 114. The CRE 118 also allows for the use of only one control unit and only one control line between the control unit and the CRE 118. Specifically, a CRE control line 127 connects the CRE control unit 129 to the CRE 118.

Now referring to FIGS. 3A-3D, various views of a CRE 118 in a closed position according to one embodiment of the present invention are provided. The CRE 118 comprises an upper segment 120, which has a first upper portion 122, a second upper portion 124, an upper hinge 126, upper guide plates 128, and an upper latch catch 130. The CRE 118 further comprises a lower segment 132, which has a first lower portion 134, a second lower portion 136, a lower hinge 138, lower guide plates 140, and a lower latch catch 142. The inner surface of first lower portion 134 and second lower portion 136 comprises a recess for receiving slips as described in further detail below. The CRE 118 further comprises a middle segment 146, which comprises a first middle portion 148, a second middle portion 150 and middle guide plates 152. The inner surface of the first middle portion 148 and the second middle portion 150 comprises a recess for receiving an EMS 144.

Next, the CRE 118 comprises multiple opening and closing assemblies. In the embodiment of the present invention depicted in FIGS. 3A-3D, upper and lower opening and closing assemblies are provided, with the upper opening and closing assembly corresponding to the upper segment 120, and the lower opening and closing assembly corresponding to the lower segment 132. As both opening and closing assemblies operate identically in some embodiments, only the upper opening and closing assembly is described herein. In a preferred embodiment, the upper opening and closing assembly comprises an upper opening ram 154, an upper bell crank 156, an upper latch rod 158, an upper latch 160, and an upper latch spring 162. The upper opening ram 154 is coupled on one end to the upper hinge 126 of the upper segment 120, and coupled on the other end to the upper bell crank 156, which is coupled to the upper latch rod 158. The upper latch rod 158 is coupled to the upper latch 160, and the upper latch 160 is further coupled to the upper guide plates 128. When the CRE 118 is in the closed position, the upper latch 160 is engaged with the upper latch catch 130, and the upper opening ram 154 is extended.

Figure 4:
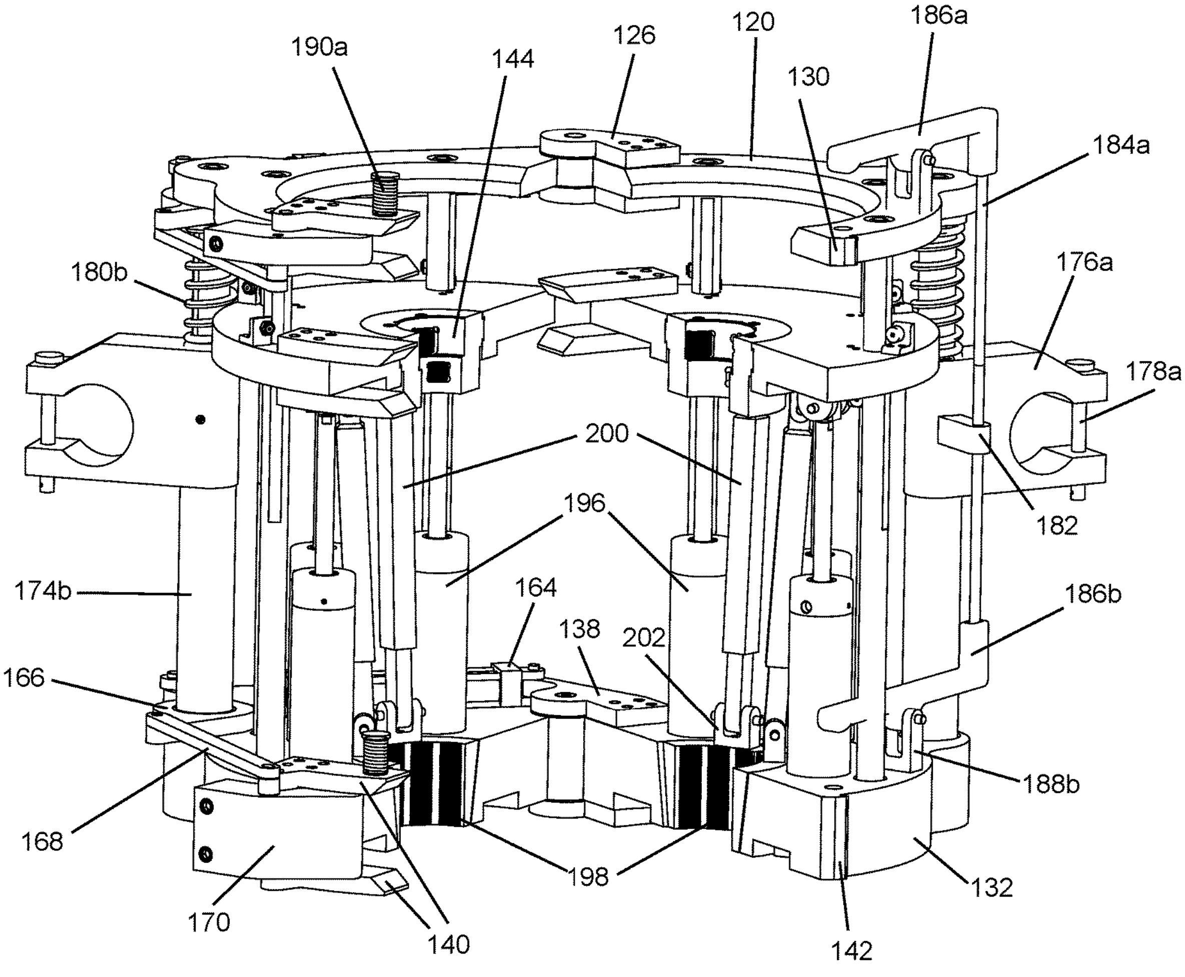
FIG. 4 is a perspective view of the compensating rig elevator of FIG. 3A in an open position according to one embodiment of the present invention.
Figure 5:
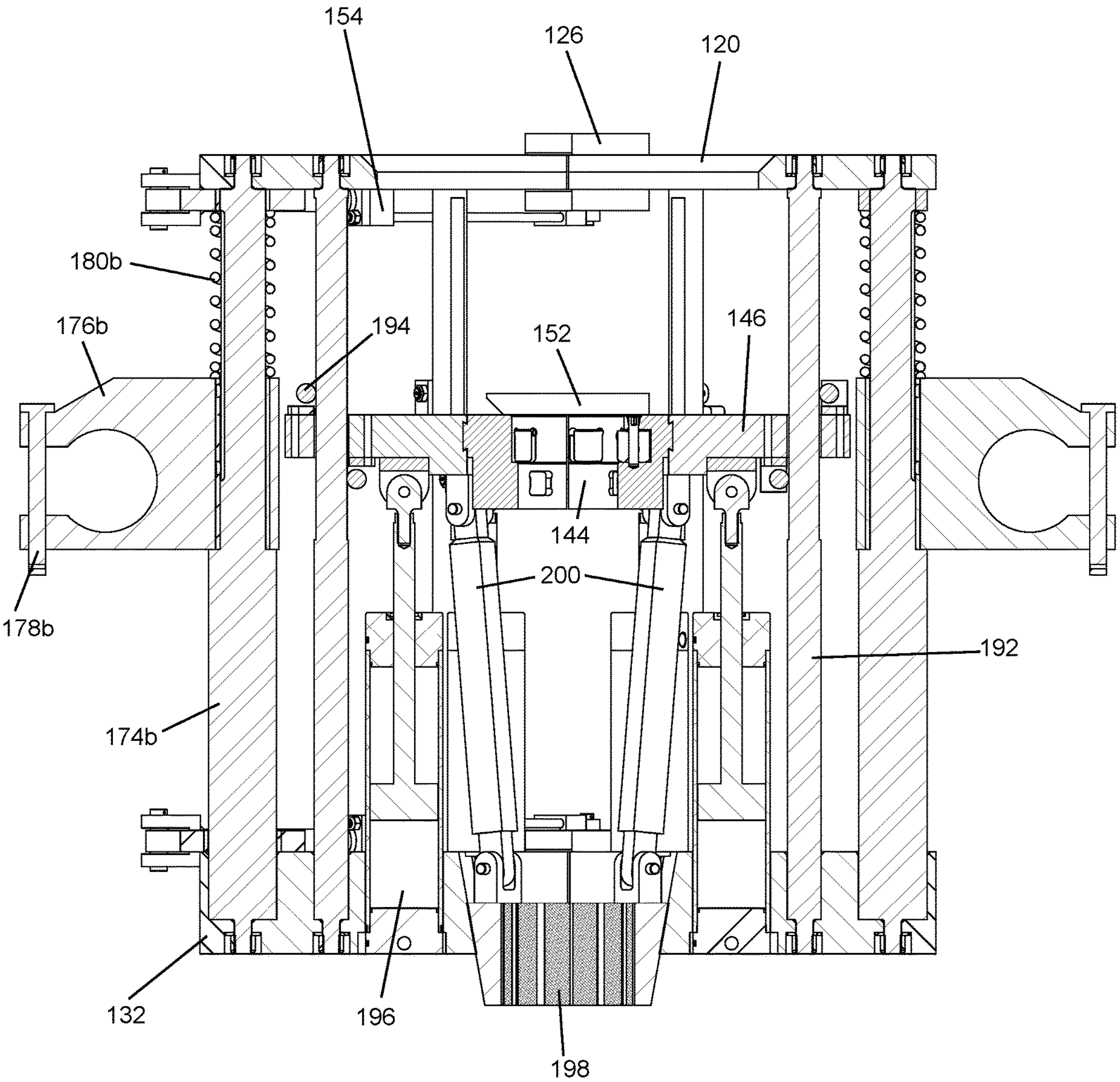
FIG. 5 is a cross-sectional view of the compensating rig elevator of FIG. 3B taken along line A-A with slips in a deployed position according to one embodiment of the present invention.
Figure 6:
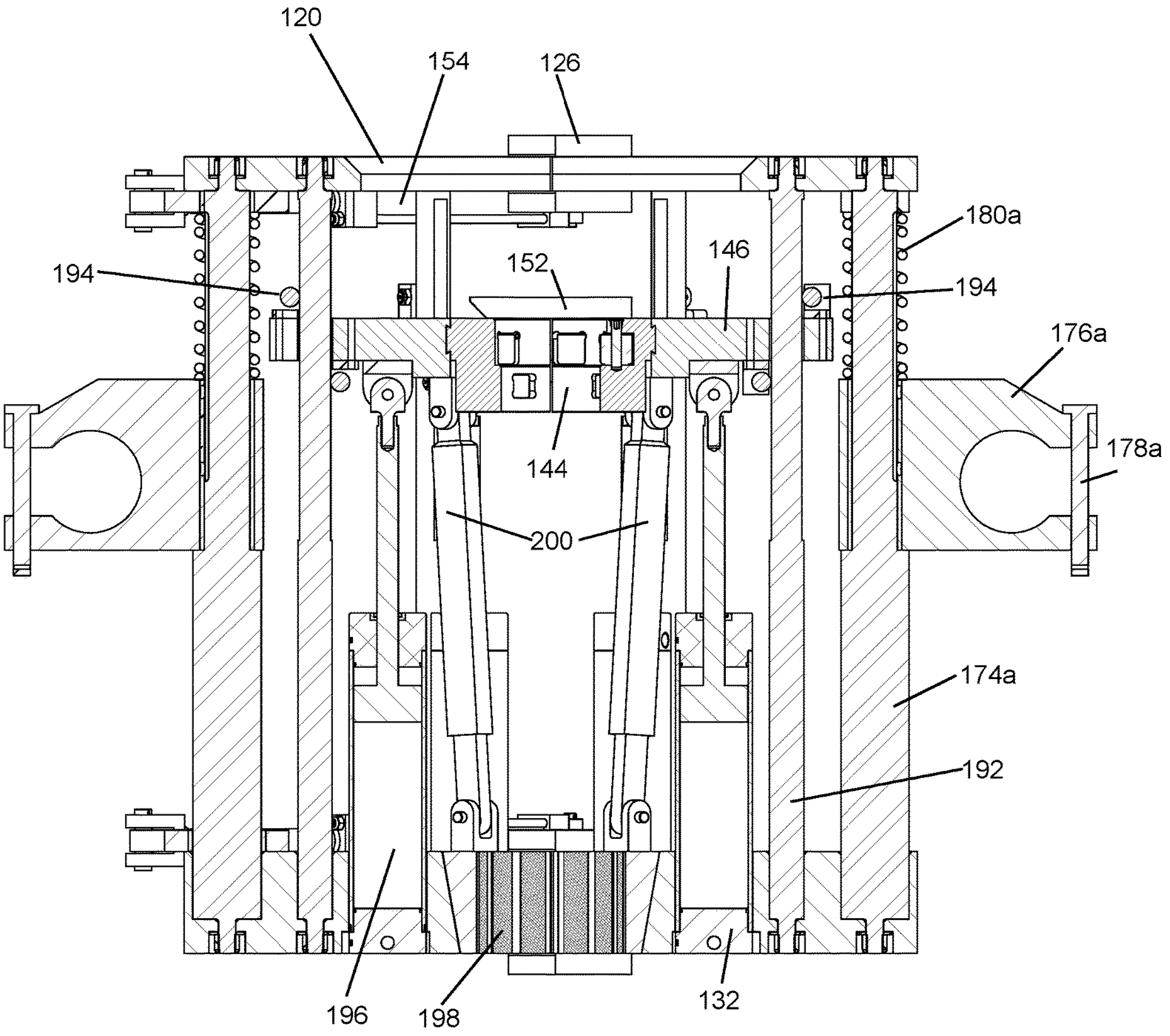
FIG. 6 is a cross-sectional view of the compensating rig elevator of FIG. 3B taken along line A-A with slips in a retracted position according to one embodiment of the present invention.
Figures 7A, 7B:
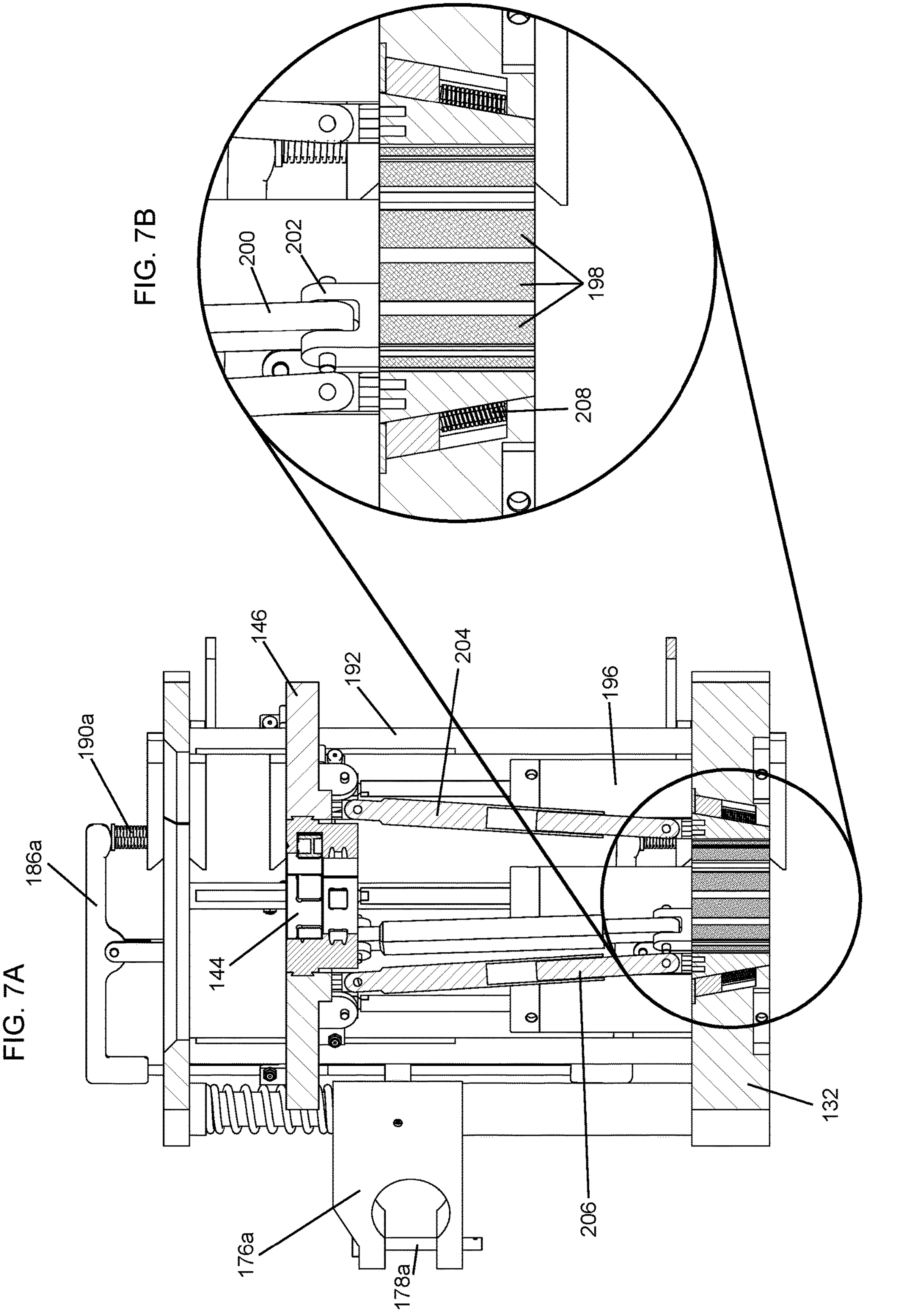
FIG. 7A is a cross-sectional view of the compensating rig elevator of FIG. 3B taken along line B-B with slips in a retracted position according to one embodiment of the present invention.
FIG. 7B is a detailed view of the compensating rig elevator of FIG. 7A according to one embodiment of the present invention.
Figures 8A, 8B:
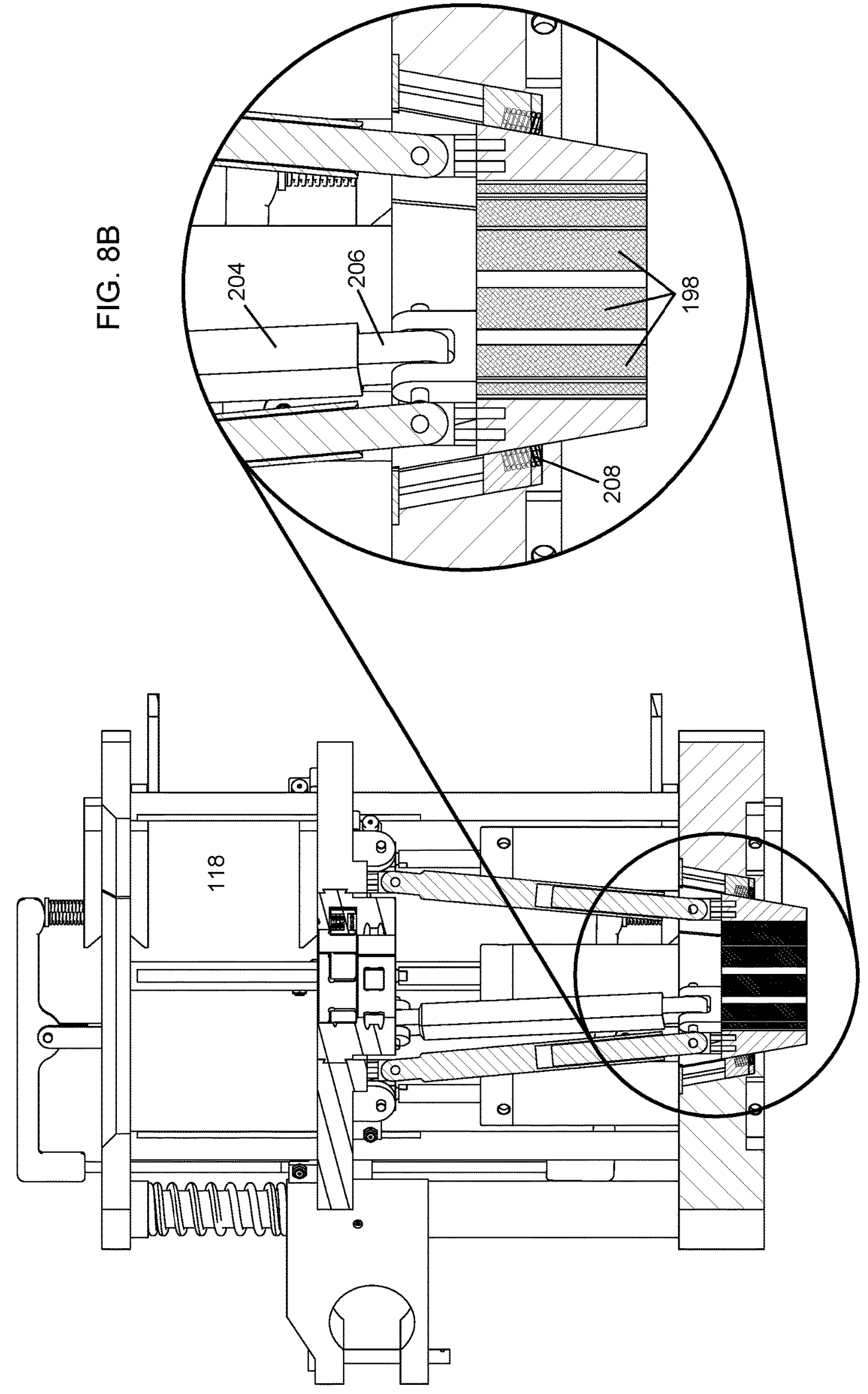
FIG. 8A is a cross-sectional view of the compensating rig elevator of FIG. 3B taken along line B-B with slips in a deployed position according to one embodiment of the present invention.
FIG. 8B is a detailed view of the compensating rig elevator of FIG. 8A according to one embodiment of the present invention.

To put the CRE 118 in the open position as shown in FIG. 4, the upper opening ram 154 is compressed by operating the associated control unit, which pulls the upper latch rod 158 by pulling the upper bell crank 156. This further causes the upper latch rod 158 to pull the upper latch 160, causing the upper latch 160 to rotate about the point at which it is coupled to the upper guide plate 128, causing the upper latch 160 to disengage from the upper latch catch 130. Once the upper latch 160 is disengaged from the upper latch catch 130, the CRE 118 opens as the upper opening ram 154 is further compressed. In order to move the CRE 118 from the open position to the closed position, the upper opening ram 154 is extended, causing the CRE 118 to close. As the first upper portion 122 and the second upper portion 124 of the upper segment 120 rotate about the upper hinge 126 and approach the closed position, the upper guide plates 128 ensure proper alignment of the first and second portions. The upper latch 160 engages the upper latch catch 130 as the CRE 118 reaches the closed position, and the upper latch spring 162 hold the upper latch 160 in the closed position until the upper opening ram 154 pulls on the upper latch rod 158.

The CRE 118 further comprises multiple hoist assemblies. One of the hoist assemblies is described herein, specifically the hoist assembly associated with the locking assembly. However, it will be appreciated that this description can apply to both hoist assemblies described in the figures. In a preferred embodiment, a hoist assembly comprises a hoist rod 174*a*, a bail arm 176*a*, a bail pin 178*a*, and a hoist spring 180*a*. The hoist rod 174*a* is disposed between the upper segment 120 and the lower segment 132. Further, a step can be machined into hoist rod 174*a*, such that the upper portion of hoist rod 174*a* has a smaller diameter than the lower portion.

The bail arm 176*a* further comprises an aperture with an internal diameter that can be larger than the outer diameter of the upper portion of hoist rod 174*a*, but smaller than the outer diameter of the lower portion of hoist rod 174*a*. The bail arm 176*a* is coupled about the upper portion of the hoist rod 174*a* in a manner such that the upper portion of the hoist rod 174*a* runs through the aperture of the bail arm 176*a*. The bail arm 176*a* can slide up and down the upper portion of the hoist rod 174*a* between the upper segment 120 and the step, and such slidability is further facilitated by tensioning screws and ball bearings located on the internal surface of the aperture of the bail arm 176*a*. Further, because the outer diameter of the lower portion of hoist rod 174*a* is larger than the internal diameter of the aperture of bail arm 176*a*, the bail arm 176*a* is prevented from sliding below the step.

A bail arm pin 178*a* is coupled to an outer surface of the bail arm 176*a*, and a hoist spring 180*a* is coupled about the upper portion of the hoist rod 174*a* between the bail arm 176*a* and the upper segment 120. The hoist spring 180*a* applies downward force to bail arm 176*a*, pushing the bail arm 176*a* towards the step.

When in operation, the CRE 118 may be suspended from a traveling block by attaching elevator bails to the bail arms 176*a*, 176*b*. The hoist springs 180*a*, 180*b* used in a particular application may be selected to provide a predetermined amount of resistance depending upon the anticipated load to be supported by the CRE 118. When a load is applied to the CRE 118, the hoist springs 180*a*, 180*b* will compress and the bail arms 176*a*, 176*b* will slide about the upper portion of the hoist rods 174*a*, 174*b* towards the upper segment 120.

In some preferred embodiments of the present invention, a locking mechanism will engage and prevent the opening rams 154, 164 or latch rods 158, 168 from disengaging the latches 160, 170 when the hoist springs 180*a*, 180*b* are compressed, thereby preventing the CRE 118 from moving from the closed position to the open position while supporting a stand. This locking mechanism may comprise a push rod attachment 182, which connects the locking mechanism to the bail arm 176*a*. The push rod attachment 182 is connected to push rods 184*a*, 184*b*, which in turn are connected to respective push arms 186*a*, 186*b*. When a predetermined weight is applied to the CRE 118, the bail arm 176*a* is pulled upward, imparting an upward motion through the push rods 184*a*, 184*b* and into the push arms 186*a*, 186*b*. The push arms 186*a*, 186*b* are rotatably connected to respective devises 188*a*, 188*b* that allow the push arms 186*a*, 186*b* to rotate when the upward force is applied to the push rods 184*a*, 184*b*. This rotation causes the push arms 186*a*, 186*b* to direct force onto the top of respective lock pins 190*a*, 190*b* to push the lock pins 190*a*, 190*b* through the upper and lower guide plate 128, 140 and into the upper and lower segments 120, 132, respectively. Once the weight is removed from the CRE 118, the bail arm 176*a* will slide downward on the hoist rod 174*a* due to the hoist spring 180*a*, imparting a downward force on the push rods 184*a*, 184*b*. This force will pull the push arms 186*a*, 186*b* off of the tops of the lock pins 190*a*, 190*b* allowing lock pin springs to force the lock pins 190*a*, 190*b* back into the unlocked position.

Next, the CRE 118 further comprises an integrated compensating system, comprising series of guide rods 192 and compensating rams 196. The guide rods 192 are disposed between the upper segment 120 and the lower segment 132, passing through apertures in middle segment 146. The guide rods 192 facilitate the vertical movement of middle segment 146, while preventing horizontal or rotational movement. Guide rollers 194 are coupled to guide tabs that are coupled to middle segment 146. The guide rollers 194 aid the ability of middle segment 146 to move upward and downward about the guide rods 192.

The integrated compensating system of CRE 118 further comprises compensating rams 196. The compensating rams 196 maintain a constant predetermined pressure, as set by the CRE control unit, in the presence of an added or removed load. After the connection is properly torqued, the CRE 118 can then be lifted via the traveling block. The increased weight on the CRE 118 will cause the compensating rams 196 to retract and allow the middle segment 146 to move downward toward the lower segment 132.

Now referring to FIGS. 5-8B, the CRE 118 may further comprise an integrated slip system comprising slip push rods 200 and slips 198. The slips push rods 200 are a two-piece system with an upper slip segment 204 coupled to the middle segment 146 of the CRE 118 and a lower slip segment 206 coupled to the lower segment 132 of the CRE 118. The lower slip segments 206 slides inside the upper slip segments 204, allowing the middle segment 146 of the CRE 118 to move up and down on the guide rollers 194. Once the middle segment 146 moves down far enough, the upper and lower slip segments 204, 206 become fully compressed and will begin to apply force to the slips 198 causing the slips 198 to slide downward and inward thus making contact with the tubular. As the CRE 118 continues to be lifted, the weight of the tubular causes teeth or grit on the slips 198 to slightly embed in the tubular. Once this occurs the entire weight of the tubular is now handled via the slips 198. The spider or slips at the rig floor can then be removed, transferring the entire weight of the string to the CRE 118 via the slips 198.

In a preferred embodiment of the present invention, the operation of CRE 118 may be controlled by various control systems known to those skilled in the art. For example, the opening and closing of CRE 118 may be accomplished by activating a control designated for such function, such as an activation lever on a control panel, which would in turn compress or extend opening rams 154, 164. Similarly, the pressure desired to be maintained by compensating rams 196 may also be controlled by such control panel. It will be appreciated that such means of operation furthers the safety benefits of CRE 118 by allowing CRE operators to operate CRE 118 without being placed in harm's way.

An exemplary method of operation is provided below with reference to the CRE 118 described in FIGS. 2-8B. The CRE 118 is first connected to the traveling block 102 via elevator bails 104. The elevator bails 104 are attached to the CRE 118 via bail arms 176*a*, 176*b* and are secured using bail arm pins 178*a*, 178*b*. The traveling block 102 then lifts the CRE 118 into position to accept the tubulars.

Once in position the CRE's 118 opening rams 154, 164 are activated to open the CRE 118. The opening rams 154, 164 pull on bell cranks 156, 166 which rotate around hoist rods 174*a*, 174*b*, and in turn, pull latches 160, 170 open via latch rods 158, 168. Continued activation of the opening rams 154, 164 caused the upper, middle and lower segments 120, 132, 146 to split apart and rotate on hinges 126, 138. Once the CRE 118 is completely opened the unit is ready to accept the tubular.

The CRE 118 alone can be used to receive vertical stands of tubulars, however a rotator or hydraulic articulating lifting bails can be used in combination with the CRE 118 to allow tubulars to be received via the V-door or similar methods. Once the tubular is in position the opening rams 154, 164 are again activated to close the CRE 118. As the opening rams 154, 164 begin to close, force is exerted on the bell cranks 156, 166 from the opening rams 154, 164, and that force rotates the bell cranks 156, 166 which forces the latches 160, 170 into the closed position. Once the latches 160, 170 are in the closed position, the segments 120, 132, 146 will begin to close. As the segments 120, 132, 146 come together the latches 160, 170 are forced to slide past respective latch catches 130, 142 via tapered surfaces on the latch catches 130, 142. Once the latches 160, 170 slide past the latch catches 130, 142, latch springs 162, 172 force the latches 160, 170 to the fully closed position, securing the CRE 118 in the closed position.

The CRE 118 can then be lifted by the traveling block 102. As the CRE 118 is lifted, the rollers of the EMS 144 will come in contact with the tubular connection. This mating of the EMS 144 with the tubular connection causes the weight of the tubular to be transferred to the CRE 118. The weight of the tubular causes the hoist springs 180*a*, 180*b* to depress which pushes the lock pins 190*a*, 190*b* into locked positions via the push rods 184*a*, 184*b* and push arms 186*a*, 186*b*. This is accomplished by the upward motion of the bail arm 176*a* which pushes up on the push rods 184*a*, 184*b* via the push rod attachment 182. As the push rods 184*a*, 184*b* are forced upward, force is applied to the push arms 186*a*, 186*b* which rotates around the respective devises 188*a*, 188*b*, thus forcing the lock pins 190*a*, 190*b* into locked positions. The lock pins 190*a*, 190*b* ensure that the CRE 118 cannot open with a tubular inside.

Once the weight of the tubular is on the middle segment 146 of the CRE 118, the compensating rams 196 can then be adjusted by the operator to force the middle segment 146 upward along the guide rods 192 to its upper most position. The middle segment 146 is held in center of the guide rods 192 via the guide rollers 194 which are located on the top and bottom of the middle segment 146 and maintain contact with the guide rods 192. Once the tubular is compensated the traveling block 102 can be lowered until the pin end of the tubular is approximately 4 to 6 inches above the box end of the tubular string. At this point the tubular can be pulled into position by hand and rotated by hand or by utilizing a strap wrench until the connection is completely hand tight.

Once this is accomplished the tubular can then be torqued up utilizing mechanical torqueing equipment. After the connection is properly torqued the CRE 118 can then be lifted via the traveling block 102. The increased weight on the CRE 118 will cause the compensating rams 196 to retract and allow the middle segment 146 to move downward toward the bottom segment 132.

Once the slip push rods 200 are fully compressed they will begin to apply force to slip devises 202 and respective slips 198 causing the slips 198 to slide downward and inward thus making contact with the tubular. Slip springs 208 provide an increasing force as the slips 198 slide downward. As the CRE 118 continues to be lifted the weight of the tubular causes the teeth or grit on the slips 198 to slightly embed in the tubular. Once this occurs the entire weight of the tubular is now handled via the slips 198. The spider or slips at the rig floor can then be removed, transferring the entire weight of the string to the CRE 118 via the slips 198. The entire string can then be lowered into the well until the end of the tubular is at the proper height required by the make-up equipment.

Once at the proper height the spider or slips at the rig floor can be set. Lowering the traveling block 102 will transfer the weight of the tubular string to the spider or slips at the rig floor. The traveling block 102 will continue to be lowered until the middle segment 146 of the CRE 118 is at its uppermost position and all of the weight of the tubular is off of the CRE 118. At that point the lock pins 190*a*, 190*b* will be released via respective lock pin springs, and the CRE 118 can be opened. After the CRE 118 is opened the traveling block 102 will lift the CRE 118 back to the receiving position and the process starts over again.

The description of the present invention has been presented for purposes of illustration and description, but is not intended to be exhaustive or limiting of the invention to the form disclosed. Many modifications and variations will be apparent to those of ordinary skill in the art. The embodiments described and shown in the figures were chosen and described in order to best explain the principles of the invention, the practical application, and to enable those of ordinary skill in the art to understand the invention.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. It is to be expressly understood that such modifications and alterations are within the scope and spirit of the present invention, as set forth in the following claims.

What is claimed is:

1. A compensating rig elevator, comprising:

a first upper portion rotatable about a hinge axis relative to a second upper portion, wherein the first upper portion is rotatable between an open position and a closed position;

a first lower portion rotatable about the hinge axis relative to a second lower portion, wherein the first lower portion is rotatable between the open position and the closed position;

a first hoist assembly connected to the first upper portion and connected to the first lower portion, and a second hoist assembly connected to the second upper portion and connected to the second lower portion, each hoist assembly having a bias member operably connected to a bail arm and operably connected to the respective upper portion to dampen motion of the bail arm toward the respective upper portion;

a push rod connected to the bail arm of the first hoist assembly; and a push arm connected to the push rod, wherein the push rod translates the movement of the bail arm of the first hoist assembly to rotate the push arm such that a distal end of the push rod moves a lock pin into a guide plate of the second upper portion to secure the first upper portion in the closed position.

2. The compensating rig elevator of claim 1, wherein the push arm has a proximal end and a distal end, and the push arm is rotatable about a lock axis that is perpendicular to the hinge axis, wherein the movement of the bail arm of the first hoist assembly is translated to the proximal end of the push rod, and the push rod rotates about the lock axis such that the distal end of the push rod moves the lock pin.

3. The compensating rig elevator of claim 1, further comprising:

an upper hinge connected to the first upper portion and connected to the second upper portion such that the first upper portion is rotatable relative to the second upper portion about the hinge axis which extends through the upper hinge; and a latch assembly connected to the upper hinge and connected to the second upper portion, the latch assembly having a latch configured to selectively interconnect to a latch catch on the first upper portion to secure the first upper portion in the closed position.

4. The compensating rig elevator of claim 3, wherein the latch assembly further comprises:

an opening ram connected to the upper hinge and connected to a bell crank, wherein the bell crank is rotatably connected to the second upper portion; and a latch rod connected to the bell crank and connected to the latch, wherein a change in length of the opening ram rotates the bell crank, which moves the latch rod, and wherein movement of the latch rod selectively interconnects the latch to the latch catch on the first upper portion to secure the first upper portion in the closed position.

5. The compensating rig elevator of claim 1, further comprising:

a first middle portion rotatable about the hinge axis relative to a second middle portion, wherein the first middle portion is rotatable between the open position and the closed position;

at least one compensating ram connecting the middle portions to the lower portions; and a plurality of rollers connected to the middle portions, wherein the plurality of rollers is configured to receive a tubular.

6. The compensating rig elevator of claim 5, further comprising:

a plurality of slip rods connected to the middle portions, each slip rod having a slip positioned at a distal end, wherein the plurality of slips form an initial inner diameter when the middle portions are an initial distance from the lower portions, and wherein the plurality of slips form a final inner diameter when the middle portions are a final distance from the lower portions such that the final inner diameter is smaller than the initial inner diameter to secure a tubular.

7. The compensating rig elevator of claim 5, further comprising:

at least one guide rod connecting the upper portions to the lower portions, wherein each guide rod of the at least one guide rod extends through an aperture in the middle portions.

8. A compensating rig elevator, comprising:

a first upper portion rotatable about a hinge axis relative to a second upper portion, wherein the first upper portion is rotatable between an open position and a closed position;

a first lower portion rotatable about the hinge axis relative to a second lower portion, wherein the first lower portion is rotatable between the open position and the closed position;

a first hoist assembly connected to the first upper portion and connected to the first lower portion, and a second hoist assembly connected to the second upper portion and connected to the second lower portion, each hoist assembly having a bias member operably connected to a bail arm and operably connected to the respective upper portion to dampen motion of the bail arm toward the respective upper portion;

a latch of said second upper portion, wherein the latch is configured to selectively interconnect to a latch catch on the first upper portion to secure the first upper portion in the closed position;

an opening ram connected to the second upper portion, wherein the opening ram extends to selectively connect the latch to the latch catch in the closed position, and the opening ram compresses to disengage the latch from the latch catch in the open position;

at least one guide plate connected to the second upper portion;

a locking mechanism connected to the first hoist assembly and to the first upper portion, wherein the locking mechanism translates the movement of the bail arm of the first hoist assembly towards the first upper portion to a lock pin that extends through the at least on guide plate and the first upper portion to secure the first upper portion in the closed position, wherein the locking mechanism further comprises:

a push rod connected to the bail arm of the first hoist assembly; and wherein the push rod translates the movement of the bail arm of the first hoist assembly to the proximal end of the push rod, and the push rod rotates about the lock axis such that the distal end of the push rod moves the lock pin through the at least one guide plate and the first upper portion to secure the first upper portion in the closed position.

9. The compensating rig elevator of claim 8, wherein the locking mechanism comprises:

a push arm connected to the push rod, the push arm having a proximal end and a distal end, wherein the push arm is rotatable about a lock axis that is perpendicular to the hinge axis.

10. The compensating rig elevator of claim 8, further comprising:

an upper hinge connected to the first upper portion and connected to the second upper portion such that first upper portion is rotatable relative to the second upper portion about the hinge axis which extends through the upper hinge;

a bell crank rotatably connected to the second upper portion; and a latch rod connected to the bell crank and connected to the latch, wherein a change in length of the opening ram rotates the bell crank, which moves the latch rod and the latch.

11. The compensating rig elevator of claim 8, further comprising:

a first middle portion rotatable about the hinge axis relative to a second middle portion, wherein the first middle portion is rotatable between the open position and the closed position;

at least one compensating ram connecting the middle portions to the lower portions; and a plurality of rollers connected to the middle portions, wherein the plurality of rollers is configured to receive a tubular.

12. The compensating rig elevator of claim 11, further comprising:

at least one guide rod connecting the upper portions to the lower portions, wherein each guide rod of the at least one guide rod extends through an aperture in the middle portions.

13. A compensating rig elevator, comprising:

a first lower portion rotatable about a hinge axis relative to a second lower portion, wherein the first lower portion is rotatable between an open position and a closed position;

a first middle portion rotatable about the hinge axis relative to a second middle portion, wherein the first middle portion is rotatable between the open position and the closed position;

at least one compensating ram connecting the middle portions to the lower portions, the at least one compensating ram configured to vary a distance between the middle portions and the lower portions; and a plurality of slip rods connected to the middle portions, each slip rod having a slip positioned at a distal end, wherein the plurality of slips form an initial inner diameter when the middle portions are an initial distance from the lower portions, and wherein the plurality of slips form a final inner diameter when the middle portions are a final distance from the lower portions such that the final inner diameter is smaller than the initial inner diameter to secure a tubular.

14. The compensating rig elevator of claim 13, further comprising:

a first upper portion rotatable about the hinge axis relative to a second upper portion, wherein the first upper portion is rotatable between the open position and the closed position; and at least one hoist rod connecting the upper portions to the lower portions.

15. The compensating rig elevator of claim 14, further comprising:

a first hoist assembly connected to the first upper portion and connected to the first lower portion, and a second hoist assembly connected to the second upper portion and connected to the second lower portion, each hoist assembly comprising:

a hoist rod from the at least one hoist rod, the hoist rod having an upper part connected to the upper portion and a lower part connected to the lower portion;

a bail arm positioned about the upper part of the hoist rod; and a bias member operably connected to the bail arm and operably connected to the upper portion to dampen motion of the bail arm toward the first upper portion.

16. The compensating rig elevator of claim 15, further comprising:

at least one guide plate connected to the second upper portion; and a locking mechanism connected to the first hoist assembly and to the first upper portion, wherein the locking mechanism translates the movement of the bail arm of the first hoist assembly toward the upper portions to a lock pin that extends through the at least one guide plate to secure the first upper portion in the closed position.

17. The compensating rig elevator of claim 16, wherein the locking mechanism comprises:

a push rod connected to the bail arm of the first hoist assembly;

a push arm connected to the push rod, the push arm having a proximal end and a distal end, wherein the push arm is rotatable about a lock axis that is perpendicular to the hinge axis; and wherein the push rod translates the movement of the bail arm of the first hoist assembly to the proximal end of the push rod, and the push rod rotates about the lock axis such that the distal end of the push rod moves the lock pin through the at least one guide plate and the first upper portion to secure the first upper portion in the closed position.

18. The compensating rig elevator of claim 14, further comprising:

an upper hinge connected to the first upper portion and connected to the second upper portion such that first upper portion is rotatable relative to the second upper portion about the hinge axis which extends through the upper hinge; and a latch assembly connected to the upper hinge and connected to the second upper portion, the latch assembly having a latch configured to selectively interconnect to a latch catch on the first upper portion to secure the first upper portion in the closed position.

19. The compensating rig elevator of claim 18, wherein the latch assembly further comprises:

an opening ram connected to the upper hinge and connected to a bell crank, wherein the bell crank is rotatably connected to the second upper portion; and a latch rod connected to the bell crank and connected to the latch, wherein a change in length of the opening ram rotates the bell crank, which moves the latch rod, and wherein movement of the latch rod selectively interconnects the latch to the latch catch on the first upper portion to secure the first upper portion in the closed position.

* * * * *